June 13, 1933.  O. SEIFFERLE  1,913,997
PRESSURE REDUCTION CONTROL FOR AUTOMATIC AIR BRAKE MECHANISM
Filed May 8, 1931  2 Sheets-Sheet 1
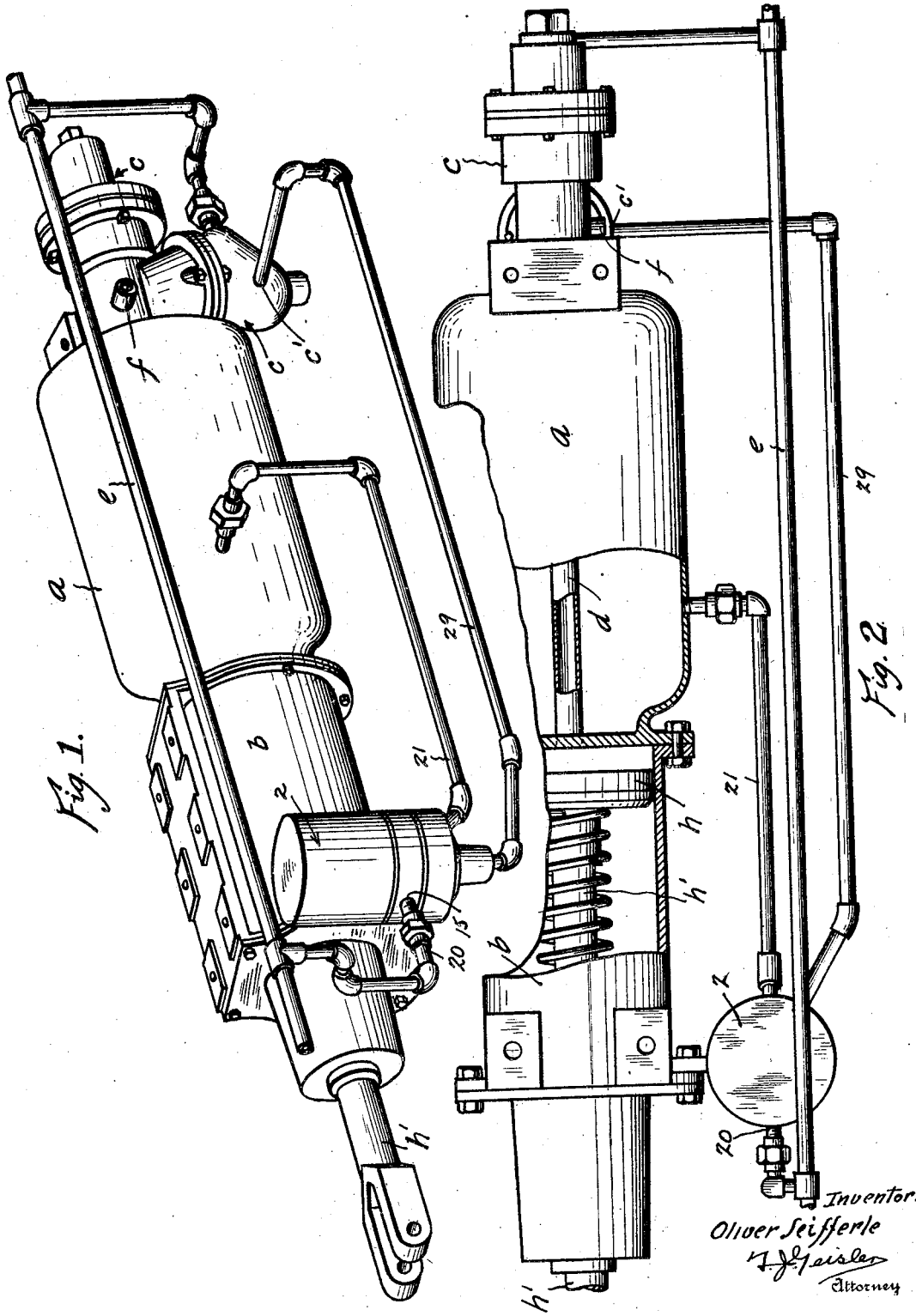

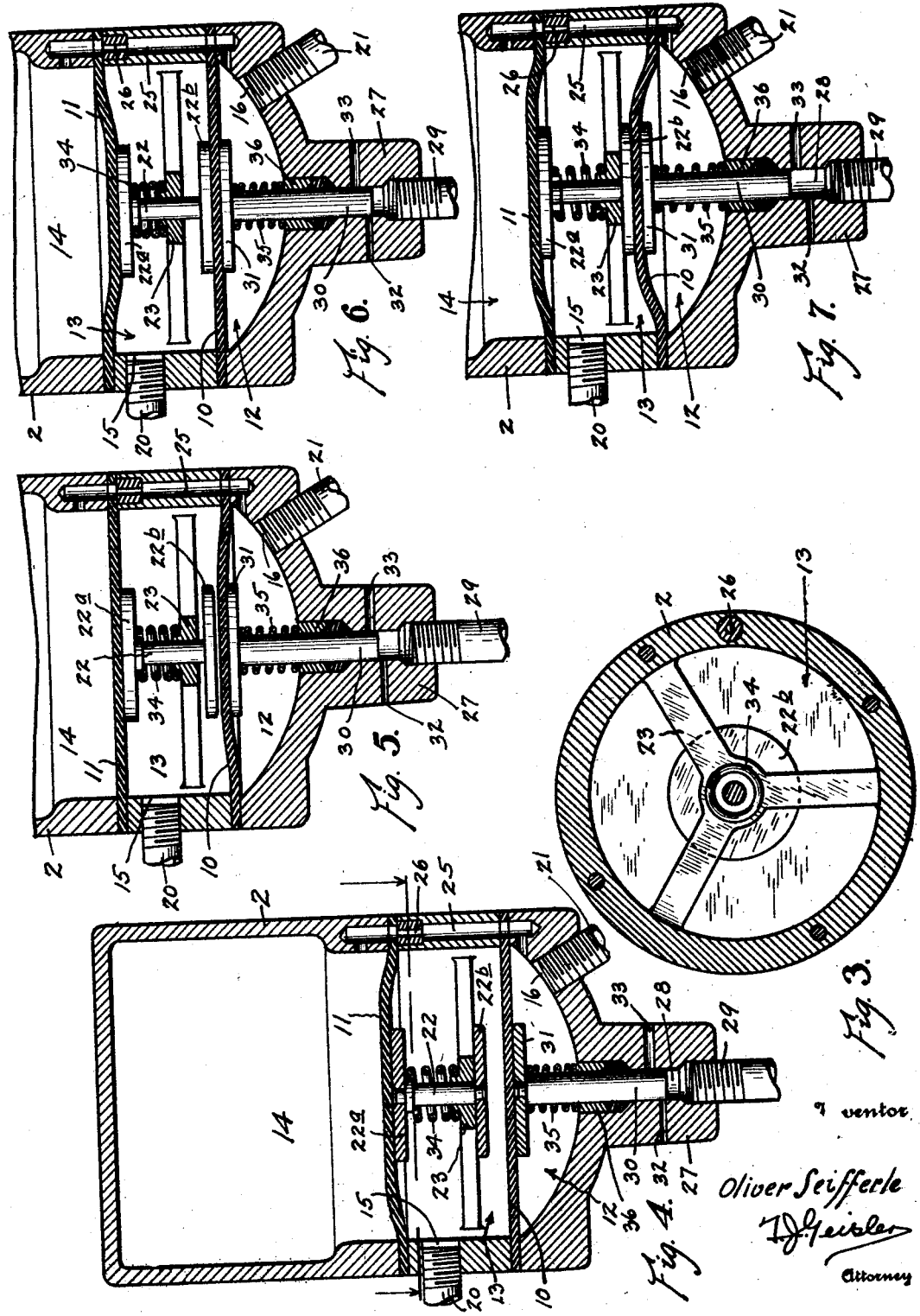

Patented June 13, 1933

1,913,997

UNITED STATES PATENT OFFICE

OLIVER SEIFFERLE, OF PORTLAND, OREGON, ASSIGNOR TO INTERNATIONAL AIR BRAKE CONTROL COMPANY, OF PORTLAND, OREGON, A CORPORATION OF OREGON

PRESSURE REDUCTION CONTROL FOR AUTOMATIC AIR BRAKE MECHANISM

Application filed May 8, 1931. Serial No. 535,868.

My invention relates to automatic air brake mechanisms and has for its general object the improvement of the pressure control so as to effect the equal and substantially simultaneous application of the brakes of all the cars in a train.

In the automatic air brake mechanisms in present use, it is impossible to apply all the brakes of a railroad train of any length, simultaneously and with equal force, for the reason that since the brakes are applied by exhausting air from the brake pipe at the locomotive, such release of pressure in the brake pipe is effective first nearest the locomotive and becomes less and less towards points more remote, due largely to the frictional resistance to the flow of air through the brake pipe. In consequence, although the reduction of pressure in the brake pipe will in time of course equalize itself, the period required for such equalization is too long to enable the efficient application of the brakes of all the cars.

In other words, as well known, the present automatic air brake mechanism comprises an auxiliary air reservoir, to which the brake-pipe is connected by means of a triple valve, which is adapted when air is exhausted from the brake pipe, to permit a volume of air proportional to that released from the brake pipe to flow from the auxiliary reservoir into the brake cylinder and effect the application of the brakes.

But, as mentioned, a reduction of pressure in the brake pipe requires an appreciable time for its full effect to travel rearward, and consequently the pressures at the triple valves in the rearward cars are not reduced sufficiently rapidly to actuate the said triple valves, with the result that the brakes are not all applied at the same time nor with equal force throughout the length of the train.

Besides, the reduction of pressure in the brake pipe tends to set up reflex waves in the compressed air in the brake-pipe, which, as it travels forward from the rear of the train, effects a momentary increase in pressure tending to release the brakes prematurely, which causes the train to jerk, and prevents a smooth stop, especially during an emergency application of the brake; and even may cause some of the cars to bump together and others to hold back, and thus cause either the derailment of the train or the tearing of it apart.

I attain the general objects of my invention by providing in an air brake mechanism an auxiliary pressure control comprising primary and secondary pressure chambers, the former connected with the brake pipe, the latter with the triple valve and the auxiliary reservoir of the brake mechanism, said connection of said triple valve provided with a variable outlet, a valve element controlling said outlet, pressure actuated means adapted to operate said valve element, whereby upon the reduction of the pressure in the brake pipe the pressure in said connection of the auxiliary air reservoir will cause the movement of said valve element to open the said outlet relatively to the degree of the reduction of the pressure in the brake pipe.

Therefore, the principal object of my invention is to provide, in an automatic air brake mechanism of a railroad train, an auxiliary pressure control, also operated by the reduction of pressure in the brake pipe, adapted to assure the required reduction of air from the triple valve and thus effect its prompt operation and provide the prompt and equal application of the brakes throughout the train whatever the number of cars composing it.

Therefore, a further object of my invention is to provide a pressure control which will operate efficiently under an emergency application of the brakes without exhausting all the air from the brake pipe; in that way avoiding the delay of the train for the time otherwise required to pump up the system in order to restore the pressure in the brake pipe.

The above mentioned and other incidental objects and features of my invention, the details of one type of construction by which I attain the same, and the mode of operation, are hereinafter fully described with reference to the accompanying drawings.

In the drawings:

Fig. 1 shows a perspective view of an automatic air-brake operating unit, including a section of the brake pipe and the triple valve and illustrates my automatic pressure control connected thereto;

Fig. 2 shows a plan view of the same with portions broken away to disclose some of the details of construction;

Fig. 3 shows a section taken on the line 3—3 of Fig. 4;

Fig. 4 shows an enlarged central vertical section of my automatic pressure control and illustrates the details of construction and relative position of the parts in their normal or inoperative positions;

Fig. 5 shows a fragmentary section similar to Fig. 4 and illustrates my pressure control in the service application position;

Fig. 6 illustrates in a similar section to Fig. 4 the relative arrangement of the parts after the application of the brakes is completed; and Fig. 7 shows in a section similar to Fig. 4, the emergency application position of my pressure control and illustrates the spider supporting the spring controlled disc located in the median chamber.

Referring now to the drawings and particularly to Figs. 1 and 2, I will first briefly describe the present air brake operating unit. This comprises, as well known, an auxiliary reservoir $a$, a brake cylinder $b$, and a triple valve $c$. The brake cylinder $b$ is connected with the auxiliary reservoir $a$ through a conduit $d$ connected with the triple valve $c$, the latter being connected to the brake pipe $e$ and provided with an exhaust port $f$. The brake pipe connects the main air reservoir in the locomotive and the auxiliary reservoirs $a$. A piston $h$ having a stem $h'$ is provided in the brake cylinder $b$ adapted to be connected in the usual manner to the car brakes, not shown.

The brakes are operated by exhausting air from the brake pipe $e$ through a brake valve located in the locomotive and operable by the engineer. This causes the triple valve $c$ to shut off the auxiliary reservoir from the brake pipe, and the exhaust port $f$, and open the conduit $d$ from the auxiliary reservoir $a$ to the brake cylinder, thus the brakes will be applied proportionately to the amount of air exhausted from the brake pipe.

However, when the brakes are applied, those at the head of the train are actuated first, since a decrease in the pressure in the brake pipe is first felt at the head of the train, while the release of the pressure in the following cars will be more and more retarded, so that the longer the train the greater the lapse of time before the brakes at the rear end of the train are applied; and likewise there is great difference in the force with which the brakes of the consecutive cars are applied.

Referring now to Figs. 3 to 7, my pressure control comprises a housing 2 divided into a release chamber 12, a median chamber 13, and a reflex chamber 14, by transverse diaphragms 10, and 11.

The median chamber 13 is provided with a port 15, connected by a pipe 20 with the brake pipe $e$ and the release chamber 12 is provided with a port 16 connected by a pipe 21 with the auxiliary reservoir $a$.

A stem 22 is reciprocably mounted between the diaphragms 10, 11 in a spider-like guide 23. Discs 22$a$, 22$b$, are provided on each end of the said stem, respectively. An expansive coil spring 34 is mounted on the said stem 22 between the guide 23 and the disc 22$a$, and is adapted to hold the said disc 22$a$ against the underside of the diaphragm 11 with a pressure of approximately three pounds and to normally hold the disc 22$b$ spaced from the diaphragm 10.

A by-pass or equalizing passageway 25 is provided in the housing wall connecting the release chamber 12 and the reflex chamber 14 having a restriction 26 of predetermined size provided therein.

The lower portion of the housing 2, comprising the chamber 12 is provided with an extension 27 which is bored, as at 28. The lower end of the bore 28 is connected by a pipe 29 to the inlet chamber of the triple valve $c$, as at $c'$. A valve member 30 having a disc-like cross head 31 is arranged in the said bore with the said cross head 31 bearing against the underside of the diaphragm 10.

A service exhaust port 32 is provided in the extension 27 communicating with the bore 28 and an emergency exhaust port 33 of greater diameter is provided above the said port 31, both of which are held normally closed by the valve member 30.

A light coil spring 35 is provided on the valve member 30 arranged to bear against the disc-like crosshead 31 of the valve member 30 to hold a packing nut 36 provided in the bore 28 against displacement.

In the operation of my pressure control, when the brake valve is set in running position, the triple valves have opened the brake pipe to the auxiliary reservoirs under a maintained gauge pressure of seventy pounds and shut off the brake cylinder so that the brakes are inoperative. Then the pressures in the median chamber 13 and release chamber 12, see Fig. 4, are equal, since they are connected respectively with the brake pipe and the auxiliary reservoir. Consequently, the pressure in the reflex chamber 14 is also equal, as it is connected with the chamber 12 by the equalizing by-pass 25. In this position, the pipe 29 from the inlet chamber of the triple valve is shut off from the service and emergency exhaust ports 32 and 33 by the valve member 30.

But, when the brakes are applied by exhausting, say three pounds of pressure from the brake pipe e, a reduction sufficient to actuate the triple valves, such reduction as it travels back to the end of the train becomes so dissipated, due to the normal leakage and friction in the brake pipe that it cannot actuate the triple valves or in any event has become so reduced relatively to the volume of air to be exhausted from the auxiliary reservoir, that the triple valves will be actuated so slowly that the brakes adjacent the rear end of the train will be only lightly and consequently unevenly applied.

However, with my pressure control, a reduction of pressure at the rear end of the train of less than three pounds either insufficient to actuate a particular triple valve or to only slightly open it, will, however, see Fig. 5, cause the pressure in the median chamber 13, connected to the brake pipe, to fall correspondingly and since the pressure in the auxiliary reservoir has not yet been affected, due to the late functioning of the triple valve, the pressure in the release chamber 12 is greater than the median chamber 13, and the diaphragm 10 and valve member 30 is forced upward according to the difference in pressure between the chambers 12 and 13, which difference in this case is small and will only raise the valve member 30 high enough to open the service exhaust port 32. The opening of the exhaust port 32 permits sufficient air to escape from the triple valve chamber to actuate the triple valve and cause the brakes to be applied accordingly.

Then, as soon as the pressure in chamber 12 falls, see Fig. 6, due to the reduction in pressure of at least three pounds in the auxiliary reservoir, as mentioned, by the application of the brakes, the pressure in the reflex chamber 14 which is connected to relief chamber 12 by the restricted by-pass 25, remains greater than in chamber 12 for an appreciable time, and forces the stem 22 and disc 22b down against the three pounds resistance of the spring 34 which is the difference in pressure sufficient to actuate the triple valves and closes the valve member 30 over the service exhaust port 32, see Fig. 5, and thus prevents an inadvertent further relief of pressure and consequent application of the brakes.

Further, the operation of my pressure control upon an emergency application of the brakes with reference to Fig. 7, is as follows:

Normally, without my pressure control, an emergency application of the brakes is made by exhausting all the air from the brake pipe, but with my pressure control upon say a ten pound gauge pressure reduction in the brake pipe the pressure in chamber 13 is reduced correspondingly depending on the distance from the locomotive, and the pressure in the relief chamber 12 then being substantially greater, the valve member 30 is moved upward, all the way, uncovering the service exhaust port 32 and the emergency exhaust port 33, which releases pressure rapidly from the inlet chamber of the triple valve and causes each triple valve to be actuated immediately throughout the train to apply the brakes with full force.

But, as each triple valve functions to release pressure from the auxiliary reservoir for applying the brake, the pressure in chamber 13 then falls and the pressure in chamber 14 being momentarily greater closes the exhaust ports 32, 33, and prevents further release of pressure from the brake pipe. Thus the emergency application of the brakes is made without exhausting all the air from the brake pipe.

Further, when an emergency application of the brakes is ordinarily made, the reflex wave set up by such reduction, which as it travels forwardly effects a momentary increase of pressure in the brake pipe, which tends to cause the brakes to release, but with my valve such reflex wave is prevented, since air is exhausted from the brake pipe at each triple valve which dissipates such reflex wave by reducing its force as it travels forward.

I claim:

1. In an automatic air-brake mechanism of the character described, the combination of an auxiliary pressure control comprising a housing divided by upper and lower transverse diaphragms into reflex, median, and release air chambers, the median chamber being connected to the brake pipe and the release chamber being connected with the auxiliary reservoir of the brake mechanism, a connection with the brake pipe, such connection having an outlet to the atmosphere, a guide in said median chamber, a stem provided with a disc at each end centrally located in said guide, a spring mounted on said stem and bearing on the disc adjacent the said upper diaphragm whereby to hold the said disc against the said upper diaphragm with predetermined pressure, an equalizing passageway connecting said reflex and release chambers, another disc located in said release chamber and carrying a valve element controlling said outlet to the atmosphere from said connection of the brake pipe.

2. In an automatic air-brake mechanism of the character described, the combination of an auxiliary pressure control comprising a housing divided by upper and lower transverse diaphragms into reflex median and release air chambers, the median chamber being connected to the brake pipe and the release chamber being connected with the auxiliary reservoir of the brake mechanism, a connection with the brake pipe, such connection having an outlet to the atmosphere, a guide in said median chamber, a stem provided with a disc at each end centrally located in said guide, a spring mounted on said stem and bearing on the disc adjacent the said upper diaphragm whereby to hold the said disc against the said upper diaphragm with predetermined pressure, an equalizing passageway connecting said reflex and release chambers, another disc located in said release chamber and carrying a valve element controlling outlets to the atmosphere from said connection of the brake pipe, said valve and said outlet arranged to vary the rate of release relatively to the position of said valve.

3. The combination with air brake mechanism of the character described, of an auxiliary control for reduction of brake pipe pressure, comprising a housing divided by diaphragms into three chambers, one connected with the brake pipe and another with the auxiliary reservoir of said mechanism, said diaphragms adapted to be operated by differences in air pressures, two of said chambers connected by a passageway, a valve controlled by one of said diaphragms, such valve in one position providing a reduction of brake pipe pressure to atmosphere, and means cooperating with said diaphragms, in one position resisting the flexing thereof.

4. The combination with air brake mechanism of the character described, of an auxiliary control for reduction of brake pipe pressure, comprising a housing divided by diaphragms into three chambers, one connected with the brake pipe and another with the auxiliary reservoir of said mechanism, said diaphragms adapted to be operated by differences in air pressures, two of said chambers connected by a passageway, a valve controlled by one of said diaphragms, such valve providing a reduction of brake pipe pressure to atmosphere, the reduction varying with the position to which said valve is moved, and means cooperating with said diaphragms, in one position resisting the flexing thereof.

5. The combination with air brake mechanism of the character described, of an auxiliary control for reduction of brake pipe pressure, comprising a housing divided by diaphragms into three chambers, one connected with the brake pipe and another with the auxiliary reservoir of said mechanism, said diaphragms adapted to be operated by differences in air pressures, two of said chambers connected by a passageway, a valve controlled by one of said diaphragms, such valve in one position providing a reduction of brake pipe pressure to atmosphere.

6. The combination with air brake mechanism of the character described, of an auxiliary control for reduction of brake pipe pressure, comprising a housing divided by diaphragms into three chambers, one connected with the brake pipe and another with the auxiliary reservoir of said mechanism, said diaphragms adapted to be operated by differences in air pressures, two of said chambers connected by a passageway, a valve controlled by one of said diaphragms such valve providing a reduction of brake pipe pressure to atmosphere, the reduction varying with the position to which said valve is moved.

7. The combination with air brake mechanism of the character described, of an auxiliary control for reduction of brake pipe pressure, comprising a housing divided by diaphragms into three chambers, one connected with the brake pipe and another with the auxiliary reservoir of said mechanism, said diaphragms adapted to be operated by differences in air pressures, two of said chambers connected by a passageway, said passageway having a restriction retarding the time of equalization of pressures in the connected chambers, a valve controlled by one of said diaphragms, such valve in one position providing reduction of brake pipe pressure to atmosphere.

8. The combination with air brake mechanism of the character described, of an auxiliary control for reduction of brake pipe pressure, comprising a housing divided by diaphragms into three chambers, one connected with the brake pipe and another with the auxiliary reservoir of said mechanism, said diaphragms adapted to be operated by differences in air pressures, two of said chambers connected by a passageway, said passageway having a restriction retarding the time of equalization of pressures in the connected chambers, a valve controlled by one of said diaphragms, such valve in one position providing a reduction of brake pipe pressure to atmosphere, and means cooperating with said diaphragms, in one position resisting the flexing thereof.

OLIVER SEIFFERLE.